(12) United States Patent  
Yasui et al.

(10) Patent No.: US 7,903,267 B2  
(45) Date of Patent: Mar. 8, 2011

(54) AUTOMATIC INSTALLATION SYSTEM FOR PRINTER DRIVER, AND PROGRAM RECORDING MEDIUM

(75) Inventors: Toru Yasui, Tokyo (JP); Takashi Araki, Yamato (JP); Keiko Fujii, Kawasaki (JP)

(73) Assignee: Kyocera Mita Corporation, Osaka (JP)

( * ) Notice: Subject to any disclaimer, the term of this patent is extended or adjusted under 35 U.S.C. 154(b) by 1500 days.

(21) Appl. No.: 11/263,984

(22) Filed: Nov. 2, 2005

(65) Prior Publication Data

US 2007/0097400 A1 May 3, 2007

(51) Int. Cl.  
G06F 15/00 (2006.01)  
G06F 3/12 (2006.01)  
G06K 1/00 (2006.01)

(52) U.S. Cl. .................. 358/1.13; 358/1.15

(58) Field of Classification Search ........ 358/1.13, 358/1.14, 1.15, 1.16; 709/218, 220, 221, 709/224, 327; 717/174, 175, 176, 177, 178; 719/321  
See application file for complete search history.

(56) References Cited

U.S. PATENT DOCUMENTS

| | | | | |
|---|---|---|---|---|
| 6,301,012 | B1* | 10/2001 | White et al. | 358/1.15 |
| 6,424,424 | B1* | 7/2002 | Lomas et al. | 358/1.14 |
| 6,959,437 | B2* | 10/2005 | Schacht et al. | 719/321 |
| 7,136,174 | B2* | 11/2006 | Chapin et al. | 358/1.13 |
| 7,213,060 | B2* | 5/2007 | Kemp et al | 709/222 |
| RE39,801 | E* | 8/2007 | Marbry et al. | 709/220 |
| 7,253,915 | B2* | 8/2007 | Kemp et al. | 358/1.15 |
| 7,353,373 | B2* | 4/2008 | Olbricht | 713/1 |
| 2002/0067504 | A1* | 6/2002 | Salgado et al. | 358/1.15 |
| 2003/0169444 | A1* | 9/2003 | Kemp et al. | 358/1.15 |
| 2003/0200291 | A1 | 10/2003 | Kemp et al. | |
| 2003/0200292 | A1 | 10/2003 | Kemp et al. | |
| 2004/0167973 | A1* | 8/2004 | Shima et al. | 709/220 |
| 2005/0162688 | A1* | 7/2005 | Nakaoka et al. | 358/1.15 |
| 2010/0134819 | A1* | 6/2010 | Kemp et al. | 358/1.13 |

FOREIGN PATENT DOCUMENTS

CN 1472642 A 2/2004

(Continued)

OTHER PUBLICATIONS

Novell Inc, Novell Distributed Print Services, Administration Guide, Netware 5.1, Jan. 2000. pp. 150 & 182. Last downloadable on Mar. 23, 2009 from the following link: http://www.novell.com/documentation/nw6p/index.html?page=/documentation/nw6p/ndps_enu/data/hk4ovawv.html.*

(Continued)

Primary Examiner — Douglas Q Tran  
(74) Attorney, Agent, or Firm — Squire, Sanders & Dempsey (US) LLP (57) ABSTRACT

An automatic installation system for printer drivers including a network; at least one printer connected to the network; a printer driver database unit which has a printer driver database and connected to the network; and a terminal connected to the at least one printer via the network, wherein the terminal is adapted to obtain a printer driver from the printer driver database, to install the printer driver, and to set configurations regarding connection and printing when a user selects one of the at least one printer from a list thereof displayed on the terminal based on printer information obtained from the at least one printer, and in a case in which a printer driver is not installed in the terminal or in a case in which a printer driver that has been installed needs to be updated.

17 Claims, 6 Drawing Sheets

FOREIGN PATENT DOCUMENTS

| | | |
|---|---|---|
| CN | 1480830 A | 3/2004 |
| JP | 11-134135 | 5/1999 |
| JP | 11-296325 | 10/1999 |
| JP | 2001-290716 | 10/2001 |
| JP | 2001-296976 | 10/2001 |
| JP | 2002-108588 | 4/2002 |
| JP | 2002-197044 | 7/2002 |
| JP | 2003-084986 | 3/2003 |
| JP | 2003-150342 | 5/2003 |
| JP | 2003-233482 | 8/2003 |
| JP | 2004-005606 | 1/2004 |
| JP | 2004-240490 | 8/2004 |

OTHER PUBLICATIONS

Chinese Office Action for Application No. 2005101155937 (with English translation).

* cited by examiner

AUTOMATIC INSTALLATION SYSTEM FOR PRINTER DRIVER, AND PROGRAM RECORDING MEDIUM

BACKGROUND OF THE INVENTION

1. Field of the Invention

The present invention relates to an art to automatically install a printer driver in a terminal which is connected to a printer via a network.

2. Description of Related Art

When using a printer while operating a terminal, both being connected to each other via a network, it is conventional to run an application which displays a list of printers in the network on the terminal and select one a user wants to use from the list. However, if the printer driver for the printer is not installed in the terminal, the user has to perform many steps before printing can be carried out.

Specifically, a step of making the terminal read a printer driver for the printer from a CD-ROM or the like and installing the printer driver in the terminal, and a step of setting a connection configuration, printing configuration or the like need to be carried out by users. If these configurations are not carried out properly, it becomes impossible to carry out printing jobs.

To solve this problem, a method of downloading a required printer driver from a website which the printer manufacturer provides via the network is disclosed. However, in the method, users have to make a correct choice regarding operational factors such as the type of OS their terminal uses, type of the printer and so forth. In addition, the users also have to set the aforementioned configurations correctly.

An identical situation exists when the printer driver installed in the terminal needs to be updated to the latest version because of a version upgrade.

Japanese Unexamined Patent Applications, First Publication Nos. 2002-197044 and 2002-108588 disclose a method of downloading a printer driver from a server based on the information on a printer driver obtained from the printer. In addition, Japanese Unexamined Patent Application, First Publication No. 2003-084986 discloses an art which automatically sets an initial configuration of a printer driver when installing from a CD-ROM or the like, by analyzing the registration status of the application at the terminal.

Furthermore, Japanese Unexamined Patent Application, First Publication No. 2001-296976 discloses an art which provides a database for printer drivers in a printer driver server, updates printer drivers for each printer by downloading from the database, and makes each printer install printer drivers in each terminal by downloading updated printer drivers.

However, in the art disclosed in Japanese Unexamined Patent Applications, First Publication Nos. 2002-197044 and 2002-108588, although selection of the type of printer is properly done by obtaining information on the printer driver from the printer itself before installing, the user may still have to download other printer drivers and set configurations regarding connection and printing. Therefore, the burden on the user is still not satisfactory.

Similarly, in the art disclosed in Japanese Unexamined Patent Application, First Publication No. 2003-084986, although the initial configuration of the printer driver is automatically set in accordance with the condition where the application is registered at the terminal, the user still has to set configurations regarding printing other than the initial configuration. Therefore, the burden on the user and time required are still not satisfactory.

Furthermore, in the art disclosed in Japanese Unexamined Patent Application, First Publication No. 2001-296976, printer drivers of the latest version are saved in the database continuously, and each printer automatically updates its printer driver using the database.

Accordingly, although the user can easily obtain a printer driver of the latest version by downloading it from the printer which the user wants to use and installing it, the user still has to set configurations regarding connection and printing similarly to the aforementioned case. Therefore, the burden on the user and time required are still not satisfactory.

SUMMARY OF THE INVENTION

To solve the aforementioned problems, the present invention provides an automatic installation system for printer drivers (below, simply referred to as the "driver installation system") including a network, at least one printer connected to the network, a printer driver database unit (below, simply referred to as the "database unit") which has a printer driver database (below, simply referred to as the "database") and connected to the network and a terminal connected to the at least one printer via the network, wherein the terminal is adapted to obtain the printer driver from the database, to install the printer driver, and to set configurations regarding connection and printing when a user selects one of the at least one printer from a list thereof displayed on the terminal based on printer information obtained from the at least one printer, in a case in which the printer driver is not installed in the terminal or in a case in which a printer driver that has been installed needs to be updated.

In the driver installation system of the aforementioned constitution, when a user selects one of the at least one printer from the list thereof displayed on the terminal, the printer driver is obtained from the database via the network when the printer driver for the printer selected is not installed in the terminal or when a printer driver that has been installed is not of the latest version, and configurations regarding connection and printing are set.

Thereby the printer driver of the latest version is automatically installed and configurations regarding connection and printing are set even if the printer driver of the latest version for the printer selected by the user is not installed in the terminal. Therefore, not only is the printer driver automatically selected and downloaded, it is also automatically installed and the configurations are automatically set. The user is thus freed from carrying out these operations.

Accordingly, although it takes a certain period of time to install and configure the printer driver, the user can use the printer connected to the network without being concerned about installing the printer driver, the same as with a printer in which a printer driver is already installed.

The terminal may be adapted to obtain database information for connection from the database unit, to access the database based on the database information, and to obtain the printer driver.

In this case, the terminal is adapted to obtain the database information from the database unit by transmitting a request for the database information. The terminal can obtain the printer driver by accessing the database quickly based on the database information.

The terminal may be adapted to transmit the printer information and terminal information obtained in advance when the terminal obtains the printer driver from the database, and the database unit may be adapted to search the printer driver based on the printer information and the terminal information sent from the terminal, and to transmit the printer driver to the terminal via the network.

In this case, the database unit is adapted to search the printer driver in the database based on the printer information and the terminal information sent from the terminal. Therefore, the printer driver for the printer selected by the user and the terminal of the user can be easily searched.

The terminal may be adapted to set a connection configuration of the printer driver, referring to an IP address included in the printer information. In this case, a connection port can be established based on the IP address in the connection configuration.

The terminal may be adapted to set printing configuration of the printer driver, based on information content included in the printer information such as options and default configuration when the terminal sets the connection configuration thereof.

In this case, the printing configuration can be set based on the printer information.

The terminal may be adapted to obtain the printer information again from the at least one printer when information is required that is not included in the printer information obtained before, in setting the printing configuration of the installed printer driver.

In this case, the printing configuration can be securely set by obtaining the printer information again from the at least one printer, with the information which is not included in the printer information obtained before.

The terminal may be adapted to notify the user of the completion of installing and setting of configurations regarding connection and printing of the printer driver after finishing the operation.

In this case, even if it takes a certain period of time for installing and setting configurations regarding connection and printing of the printer driver, the user can use the time for another job due to a notification by a sound of alarm or the like.

The database unit may be adapted to construct the database, obtaining printer drivers from each printer driver provider of the at least one printer.

In this case, the database for the at least one printer connected to the network is constructed in the database unit, for example, by an application for database construction used by the administrator.

The database unit may be provided in a server machine or in the terminal, and be adapted to update the database by obtaining the printer driver of the latest version from the printer driver provider of the at least one printer by accessing the Internet via the server machine or the terminal.

In this case, the database for the printers connected to the network is constructed in a server machine for network administration or exclusive use, or in at least one of the terminals connected to the network.

At that time, it is preferable that the network administrator configures the system to automatically check for updates so that the printer driver of the latest version can be obtained from the printer driver provider via the Internet.

The database unit may be provided in the at least one printer, and be adapted to update the database by obtaining the printer driver of the latest version from the printer driver provider of each printer by accessing the Internet via the at least one printer, the server machine or the terminal.

In this case, the database for the printers connected to the network is constructed in at least one of the printers connected to the network.

At that time, the configuration regarding database updates is set so that the printer driver of the latest version can be obtained from the printer driver provider, via the at least one printer in a case in which the at least one printer is connectable to the Internet, or via the server machine or the terminal in a case in which the at least one printer is not connectable to the Internet.

The database for all the printers connected to the network may be provided in one printer. The database may also be provided in each printer, having printer drivers only for each printer.

The database unit may be adapted to generate the database information after construction of the database. In this case, since the database unit always has the database information on the printer driver of the latest version, not only when the printer driver of the at least one printer selected is not installed but also when the printer driver is not of the latest version, the terminal can access the database based on the database information.

The database may be adapted to delete an older version printer driver and to update the database information.

In this case, by deleting older version printer drivers and updating the printer driver to the latest version, the limited memory area of the database can be effectively utilized.

In addition, the present invention provides a program recording medium in which a program is recorded for automatic installation of a printer driver in a terminal in a system including a network; at least one printer connected to the network; a database unit which has a database connected to the network; and a terminal connected to the printer via the network, and the program includes a step of selecting one of the at least one printer from a list thereof, a step of obtaining the printer driver of the at least one printer from the database, a step of installing the printer driver, and a step of setting configurations regarding connection and printing after installing.

In this way, the present invention can be realized as a program.

DETAILED DESCRIPTION OF THE INVENTION

First Embodiment

An explanation of a driver installation system of the first embodiment of the present invention is presented hereinbelow, referring to FIG. 1.

Figure 1:
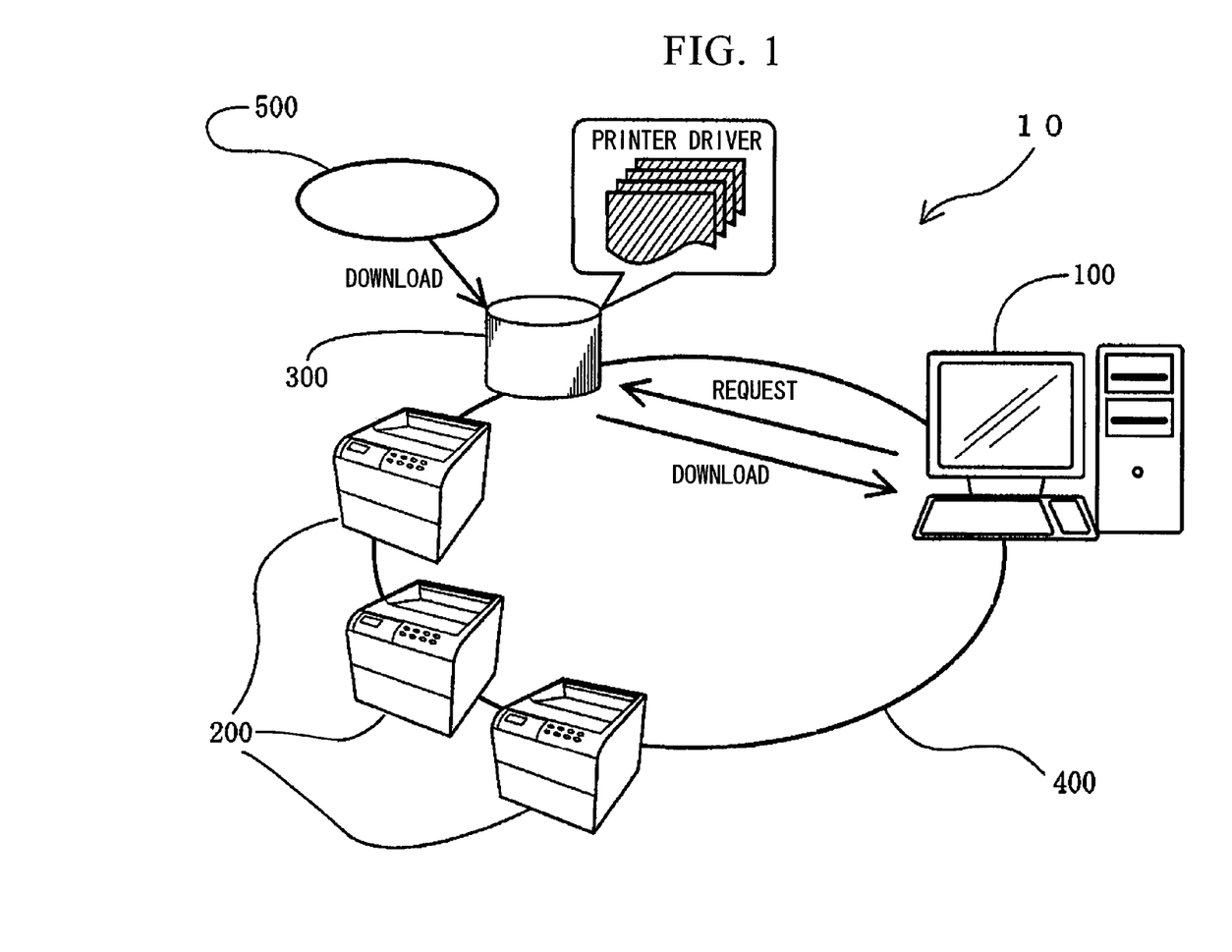
FIG. 1 is a drawing which schematically shows the constitution of a driver installation system according to a first embodiment of the present invention.

As shown in FIG. 1, a driver installation system 10 consists of a user terminal 100, a printer 200, a database 300, a network 400 and the Internet 500.

Although the user terminal 100 and three printers 200 are connected to the network 400 in FIG. 1, this embodiment is not limited to this, and two or more user terminals 100 and one, two, four or more printers 200 may be connected.

Although the network 400 is constituted as a closed local area network (LAN) such as an in-office LAN, the Internet may also be used.

The Internet 500 is of a known constitution. It is possible to download a required printer driver of the latest version by accessing a website of a printer driver provider, such as the printer manufacturer (not illustrated in FIG. 1.)

The user terminal 100 is a terminal device such as a personal computer, and is connected to the network 400.

An application to enable installation of a printer driver is installed in the user terminal 100, and the user terminal 100 operates as follows by running the application.

First, when a user 110 carries out printing, the user terminal 100 searches printers which are available and connected to the network 400, obtains information about the printers such as type number, displays a list of the available printers on the display, and saves the information of each printer in a registry or memory area.

When the user 110 selects one printer from the list, the user terminal 100 accesses the database 300 via the network 400, based on already-obtained database information.

The user terminal 100 transmits information about the selected printer and the user terminal 100 (such as OS, language used) to the database 300.

Then the user terminal 100 receives a printer driver transmitted from the database 300, installs the printer driver automatically, establishes a connection port based on an IP address included in the printer information, sets a connection configuration, and sets a printing configuration of the printer driver based on the information content included in the printer information such as options, and default configuration.

When setting the printing configuration if information required is not included in the printer information, the user terminal 100 again obtains printer information including the information from the printer 200 via the network 400.

After obtaining and installing the printer driver and setting configurations regarding connection and printing, the user terminal 100 notifies the user. This notification is carried out by displaying a message on the display of the user terminal 100, sounding an alarm, or the like.

Each printer 200 is connected to the network 400. The printers 200 receive printing data from the user terminal 100 connected to the network 400 and carry out printing.

The printers 200 carry out print jobs based on the connection configuration and the printing information installed in the user terminal 100.

In addition, each printer 200 has printer information including a connection IP address to the network 400, constitution information such as options, and default configuration, and transmits the printer information to the user terminal 100 when requested.

The database 300 is a database of the printer drivers automatically constructed by an administrator of the network 400 by running an application for database construction provided by the printer driver provider, using an administration server machine or a terminal device for exclusive use (not illustrated).

Here, the application for database construction obtains the printer driver of the latest version for the printer from the printer driver provider such as the manufacturer of the printer via the Internet 500, based on the model name of the printer selected by the administrator or automatically obtained, and registers the printer driver in the database.

At that time, the administrator presets the connection configuration to the Internet 500, that is, a database update configuration 310 such as an interval when the latest version can be obtained.

Figure 2:
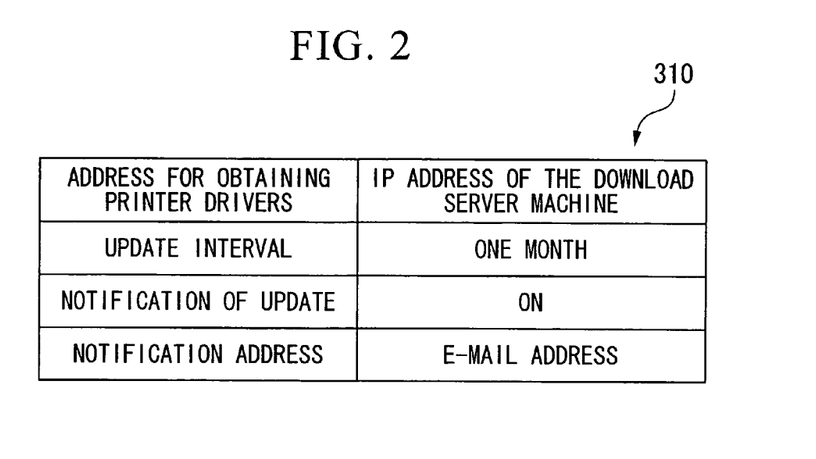
FIG. 2 is a table which shows an example of information in a database updating configuration in the driver installation system of FIG. 1.

The database update configuration 310 includes information about access points for obtaining printer drivers (IP address of a download server), interval for checking updates, on/off of update notification, notification object (e-mail address), as shown in FIG. 2.

Figure 3:
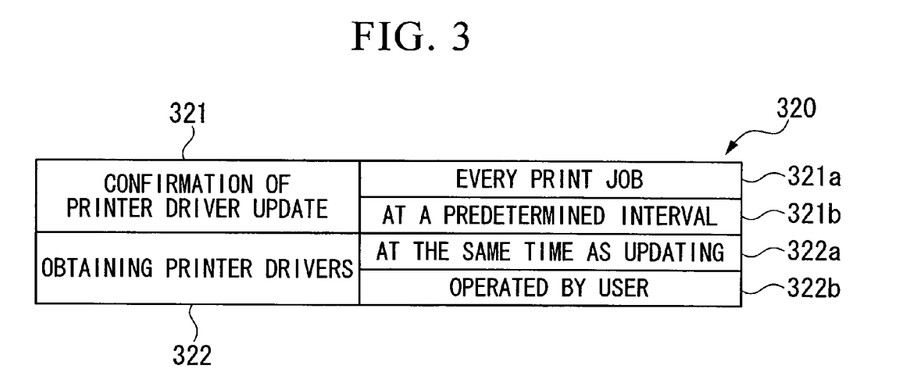
FIG. 3 is a table which shows an example of information in a application operation configuration in the driver installation system of FIG. 1.

The database 300 also provides operation configuration information 320 shown in FIG. 3 for obtaining printer drivers of the latest version.

Here, in FIG. 3, the operation configuration information 320 is set by selecting any one of "EVERY PRINT JOB" 321a and "AT A PREDETERMINED INTERVAL" 321b in confirmation for printer driver update 321, and selecting any one of "AT THE SAME TIME AS UPDATING" 322a and "OPERATED BY USER" 322b in obtaining printer drivers 322.

The database 300 compiles database information 330 which explains the content of the database after finishing construction or updating the database.

The database 300 transmits the database information 330 to the user terminal 100 when the database 300 receives a request for the database information from the user terminal 100.

Figure 4:
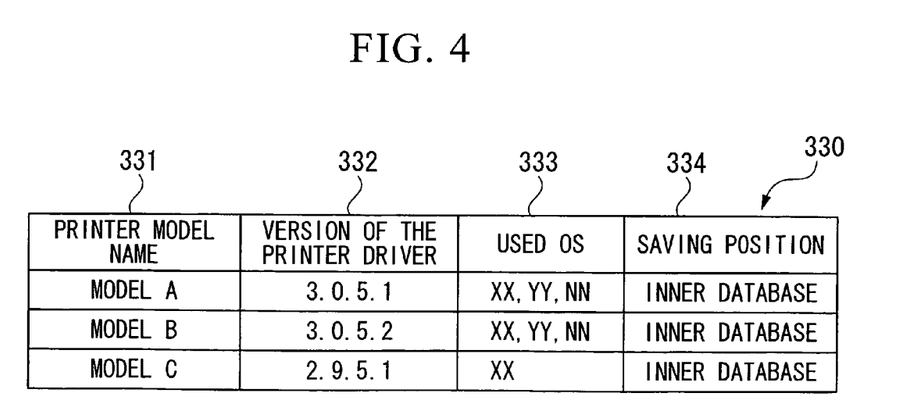
FIG. 4 is a table which shows database information in the driver installation system of FIG. 1.

Here as shown in FIG. 4, the database information 330 includes a printer model name 331, driver version 332, used OS 333, and saving position 334, and these information is stored for each printer model, for example, A, B, and C.

Although the database 300 is disposed in the network 400 independently in FIG. 1, it is actually constructed in a server for a database connected to the network 400.

The database 300 may be constructed in a server for network administration or one of the user terminals 100.

Figure 5:
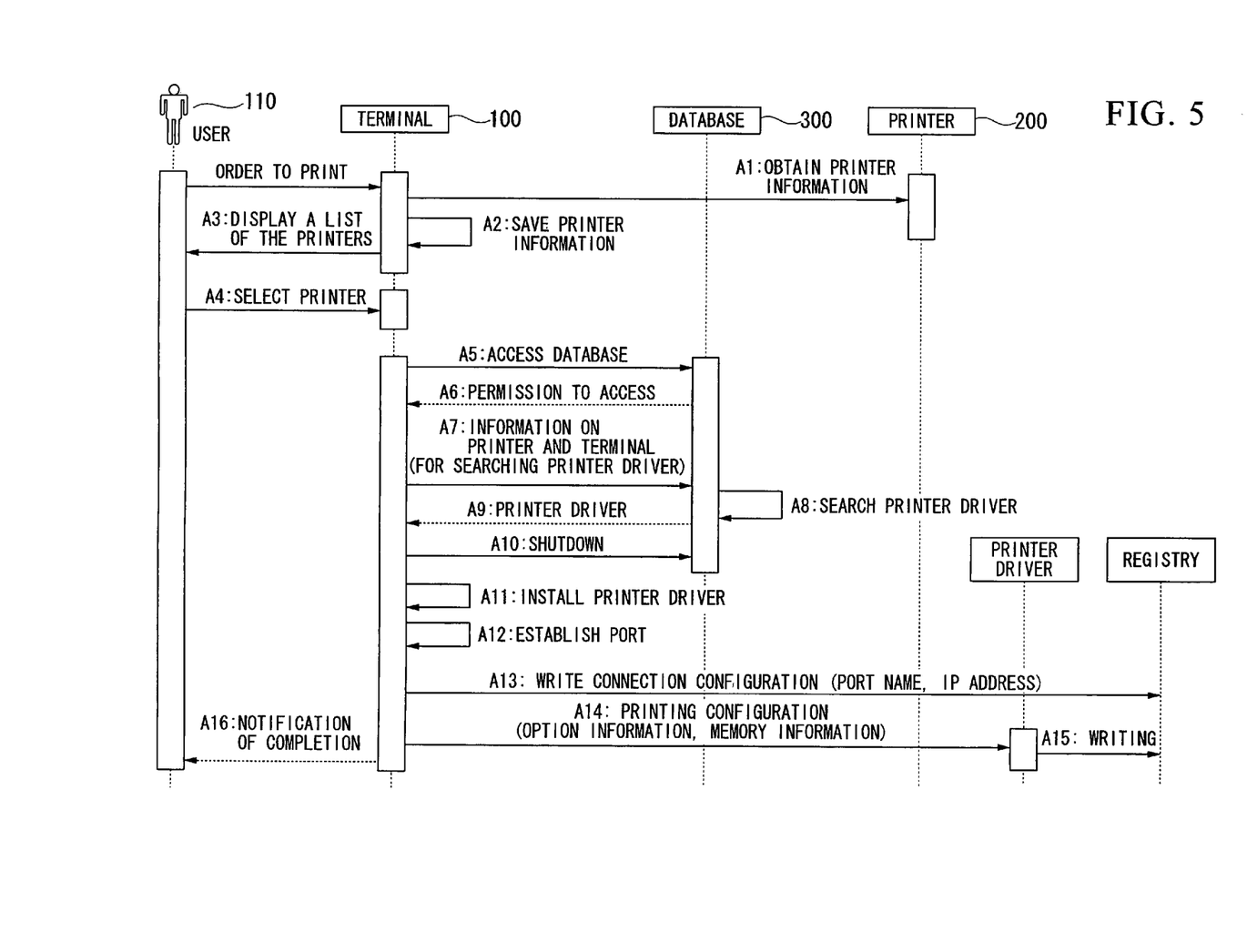
FIG. 5 is a flowchart which shows the process involved in automatic installation of a printer driver in the driver installation system of FIG. 1.

Next, an explanation of an operation of the driver installation system 10 according to the embodiment is presented, referring to FIG. 5.

FIG. 5 is a flowchart showing a process of the automatic installation of a printer driver in the driver installation system 10.

First, in FIG. 5, the user 110 commands the user terminal 100 to carry out a print job. The user terminal 100 obtains the printer information from the printers 200 connected to the network 400 (step A1), saves the information in a registry or memory area (step A2), and displays a list of the printers on the display (step A3).

After the user 110 selects one printer (step A4), the user terminal 100 accesses the database 300 via the network 400 (step A5).

Information for the connection to the database 300 (IP) can be automatically obtained by the database 300 transmitting the database information 330 to the user terminal 100 as a response to the user terminal 100 transmitting a demand for the database information to the whole network 400.

After connection is permitted (step A6), the user terminal 100 transmits the printer information and the terminal information to the database 300 (step A7).

Then the database 300 makes a search in the database based on the printer information and the terminal information (step A8) and transmits a found printer driver to the user terminal 100 via the network 400 (step A9).

When the user terminal 100 receives the printer driver, the connection to the database 300 (step A10) is closed.

After installing the printer driver (step A11), the user terminal 100 establishes a port and sets a connection configuration based on an IP address included in the printer information (step A12), and writes the connection configuration in its registry (step A13).

Then the user terminal 100 sets a printing configuration of the printer driver based on the information content included in the printer information such as options and default configuration (step A14) and writes the printing configuration in its registry (step A15).

Through these processes, the connection configuration and the printing configuration are written in the registry. The printer driver automatically sets configurations when starting up by reading the configurations in the registry.

At the end, the user terminal 100 notifies the user 110 of the completion of the automatic installation of the printer driver by displaying a message on the display of the user terminal 100, sounding an alarm, or the like (step A16).

Thus, the automatic installation of the printer driver and all the necessary configurations is completed.

Second Embodiment

An explanation of a driver installation system of the second embodiment of the present invention is presented hereinbelow, referring to FIG. 6.

Figure 6:
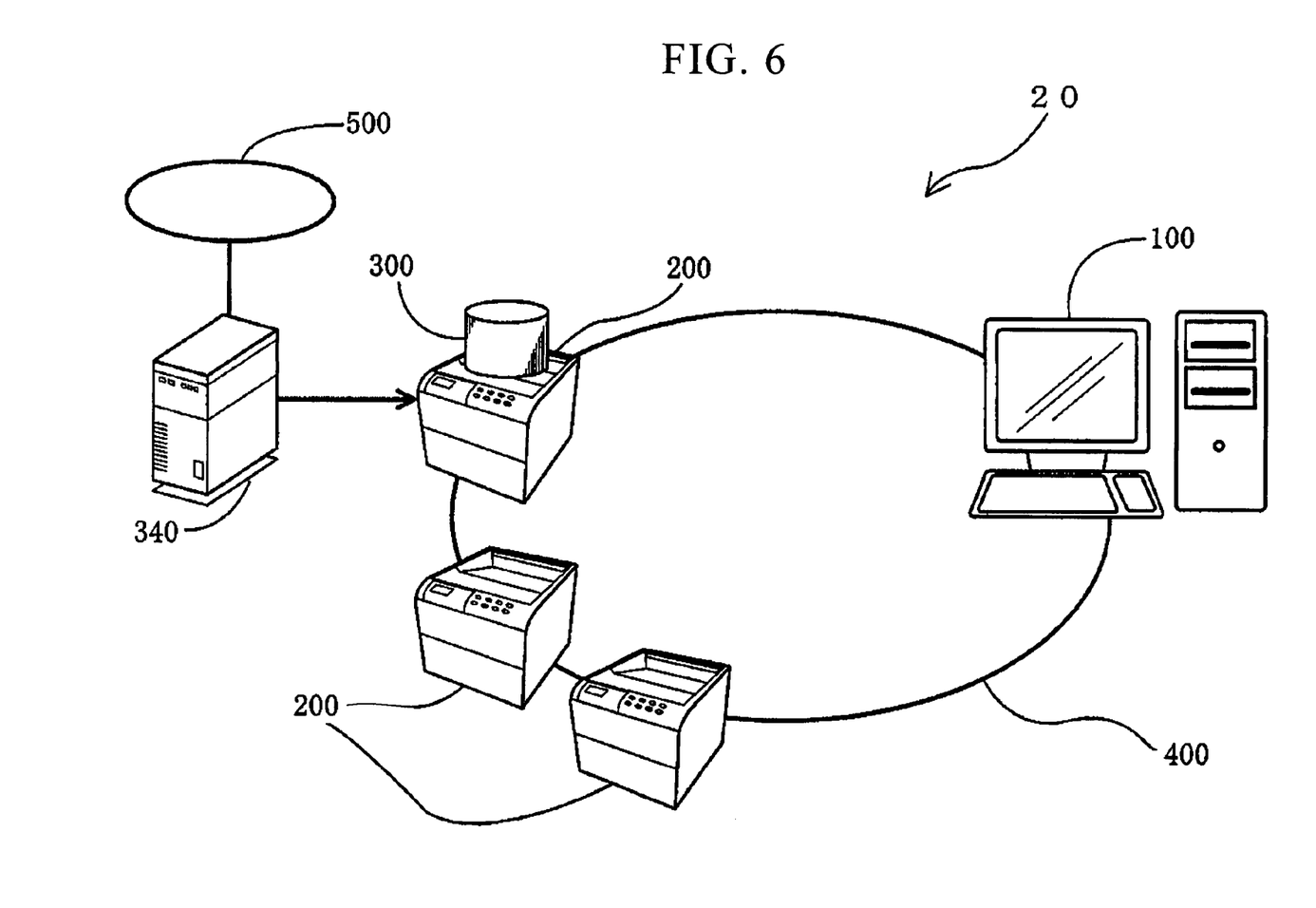
FIG. 6 is a drawing which schematically shows the constitution of a driver installation system according to a second embodiment of the present invention.

In FIG. 6, the driver installation system 20 has an almost identical constitution as the driver installation system 10 shown in FIG. 1. Therefore, the same reference numerals are provided for the same elements and explanations thereof are omitted.

In the driver installation system 20, the database 300 is constructed in one of the printers 200. The driver installation system 20 differs from the driver installation system 10 in that the printer 200 is connected to the Internet 500 via a download server machine 340.

The database 300 provided in the printer 200 is constructed so as to include all the printer drivers for the printers 200 connected to the network 400.

The configuration of the database 300 is set in the same way as in the driver installation system 10; the database 300 downloads printer drivers from the printer driver provider by the download server machine 340 via the Internet 500 and saves the printer drivers in the download server machine 340.

Figure 7:
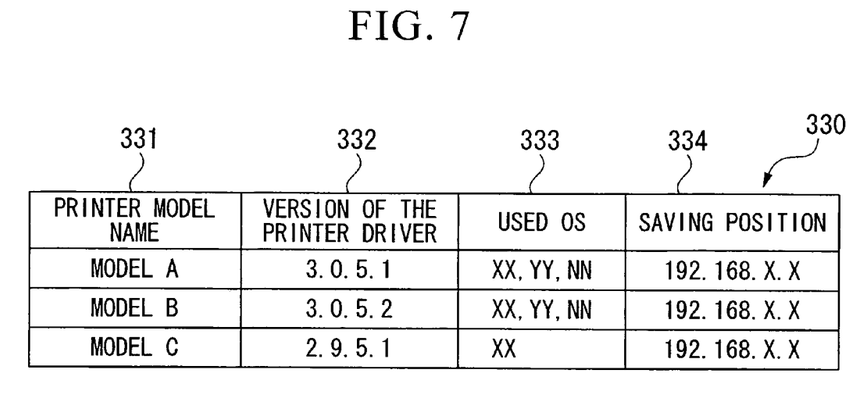
FIG. 7 is a table which shows an example of database information in the driver installation system of FIG. 6.

Here as shown in FIG. 7, the database information 330 includes the printer model name 331, driver version 332, used OS 333, and saving position 334, and this information is stored for each printer model. In this case, the IP address of the printer 200, "192. 168. X. X" is set as the saving position 334.

The database which has all the printer drivers for all of the printers 200 does not have to be provided in one printer 200. For example, the database 300 may be divided into two portions and provided in two printers. In this case, in the database information 330, each IP address of the printer which saves the printer driver is set as the saving position 334.

Figure 8:
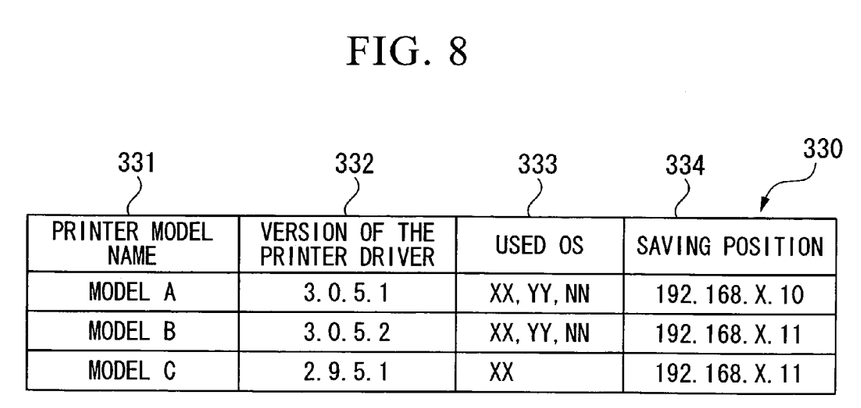
FIG. 8 is a table which shows another example of database information in the driver installation system of FIG. 6.

That is, in FIG. 8, the printer driver for a model A printer is saved in the printer itself, and the printer drivers for model B and C printers are saved in the model B printer.

In a case in which the database 300 is constructed among a plurality of printers, the database information 330 is saved in any one printer among which a portion of the database 300 is constructed.

Figure 9:
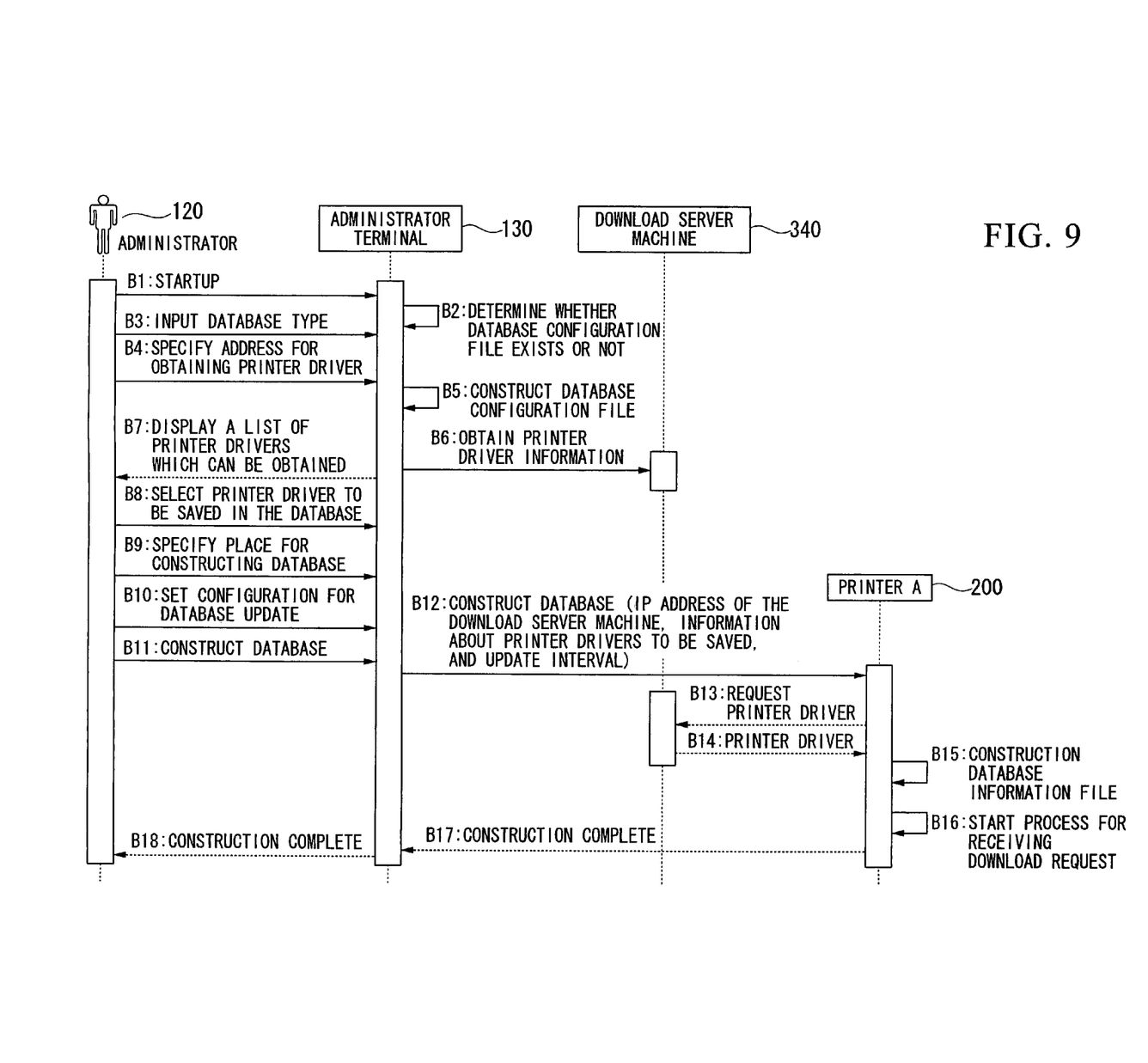
FIG. 9 is a flowchart which shows the process involved in constructing the database for printer drivers in the driver installation system of FIG. 6.

Next, an explanation of an operation of the driver installation system 20 according to the embodiment is presented, referring to FIG. 9.

FIG. 9 is a flowchart showing a process of the construction of the database 300 in the driver installation system 20.

In FIG. 9, an administrator 120 starts up an application for database construction at an administrator terminal 130 (step B1). The administrator terminal 130 determines whether it has a database configuration file (step B2), and encourages the administrator 120 to input a database type if there is no database configuration file (step B3), and to input the access point for obtaining printer drivers (step B4).

The administrator terminal 130 constructs the database configuration file based the above information about the database type and the access point for obtaining printer drivers (step B5).

After the aforementioned process, or in the case in which the database configuration file already exists, the administrator terminal 130 obtains printer driver information from the download server machine 340 based on the database configuration file (step B6).

The administrator terminal 130 displays a list of printer drivers available, based on the printer driver information (step B7).

Then the administrator 120 selects one or more printer drivers to be saved in the database (step B8), decides where the database is to be made (one of the printers 200) (step B9), sets a database update configuration (step B10), and orders a database to be constructed (step B11).

Thus the administrator terminal 130 constructs a database for printer drivers in the selected printer 200 based on information such as the IP address of the download server machine 340, printer drivers to be saved, and update configuration information (step B12).

In constructing a database, the selected printer 200 requests transmission of the printer drivers to the download server machine 340 (step B13) and obtains the printer drivers. Thereby a database for the printer drivers is constructed (step B14).

After constructing the database information based on the constructed database (step B15), the printer 200 starts a receiving process of requests for printer driver downloads to the database (step B16) and stands by for requests for printer driver downloads from each terminal 100. Then the printer 200 commands the administrator terminal 130 to terminate operations (step B17). The administrator terminal 130 notifies the administrator 120 of the completion of the processes.

Thereby, construction of a database for printer drivers is completed.

In the aforementioned embodiments, although the database 300 is provided in a server machine connected to the Internet 500 or in the printer 200, this is in no way limiting. In a case in which a printer which is connectable to the Internet 500 is used, the printer 200 may be connected to the Internet 500 directly, without using the download server machine 340.

According to the present invention, in a case where a printer driver is not installed in a terminal which a user uses, or in a case where a printer driver installed in a terminal is not the latest version, the terminal automatically downloads and installs the printer driver. In addition, configurations regarding connection and printing of the printer driver are also automatically carried out. Therefore, printer drivers are easily and simply installed without requiring troublesome operations.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An automatic installation system for printer drivers comprising:
    a network;
    at least one printer connected to the network;
    a printer driver database unit which has a printer driver database and connected to the network; and
    a terminal connected to the at least one printer via the network, wherein when at least one of
        a user selects one of the at least one printer to be installed or to print from a list thereof displayed on the terminal based on printer information obtained from the at least one printer, and
    a printer driver is not installed in the terminal or when a printer driver that has been installed needs to be updated, the terminal is configured
    to obtain a printer driver from the printer driver database, to install the printer driver, and,
        after installing the printer driver, to set configurations regarding connection and printing of the selected one of the at least one printer, and
        the terminal is configured
        to set a printing configuration of the printer driver, based on information content included in the printer information comprising options and default configuration when the terminal sets the connection configuration thereof, and
        to obtain the printer information again from the at least one printer when information is required that is not included in the printer information obtained before, in setting the printing configuration of the printer driver.

2. An automatic installation system for printer drivers according to claim 1, wherein the terminal is configured to obtain database information for connection from the printer driver database unit, to access the printer driver database unit based on the database information, and to obtain the printer driver.

3. An automatic installation system for printer drivers according to claim 1, wherein the terminal is configured to transmit the printer information and terminal information obtained in advance when the terminal obtains the printer driver from the printer driver database, and the printer driver database unit is configured to search the printer driver based on the printer information and the terminal information sent from the terminal, and to transmit the printer driver to the terminal via the network.

4. An automatic installation system for printer drivers according to claim 1, wherein the terminal is configured to set a connection configuration of the printer driver, referring to an IP address included in the printer information.

5. An automatic installation system for printer drivers according to claim 1, wherein the terminal is configured to notify the user of the completion of installation and setting of configurations regarding connection and printing of the printer driver after completing the installation and the setting of the configurations.

6. An automatic installation system for printer drivers according to claim 1, wherein the printer driver database unit is configured to construct the printer driver database by obtaining printer drivers from each printer driver provider of the at least one printer.

7. An automatic installation system for printer drivers according to claim 6, wherein the printer driver database unit is provided in a server machine or in the terminal, and is configured to update the printer driver database by obtaining the printer driver of the latest version from the printer driver provider of the at least one printer by accessing the Internet via the server machine or the terminal.

8. An automatic installation system for printer drivers according to claim 6, wherein the printer driver database unit is provided in the at least one printer, and is configured to update the printer driver database by obtaining the printer driver of the latest version from the printer driver provider of the at least one printer by accessing the Internet via the at least one printer, the server machine or the terminal.

9. An automatic installation system for printer drivers according to claim 6, wherein the printer driver database unit is configured to generate the database information after construction of the printer driver database.

10. An automatic installation system for printer drivers according to claim 6, wherein the printer driver database unit is configured to delete an older version printer driver and to update the database information.

11. A computer readable memory medium in which a computer executable control program is recorded for automatic installation of a printer driver in a terminal of a system, which includes a network, at least one printer connected to the network, a printer driver database unit which has a printer driver database connected to the network, and a terminal connected to the at least one printer via the network, the program executed by a processor comprising:
    selecting one of the at least one printer to be installed or to print from a list thereof;
    obtaining the printer driver of the at least one printer from the printer driver database;
    installing the printer driver; and
    setting configurations regarding connection and printing after installing the printer driver of the selected one of the at least one printer, wherein
    the terminal is configured
    to set a printing configuration of the printer driver, based on information content included in printer information obtained from the at least one printer comprising options and default configuration when the terminal sets a connection configuration thereof, and
    to obtain the printer information again from the at least one printer when information is required that is not included in the printer information obtained before, in setting the printing configuration of the printer driver.

12. A computer readable memory medium according to claim 11, wherein
    the terminal is configured to obtain database information for connection from the printer driver database unit for accessing the printer driver database unit and obtaining the printer driver,
    when obtaining the printer driver from the printer driver database, the terminal transmits the printer information and terminal information which are obtained in advance, and the printer driver database unit searches the printer driver based on the printer information and the terminal information sent from the terminal, and transmits the printer driver to the terminal via the network.

13. A computer readable memory medium according to claim 11, wherein the terminal notifies the user of the completion of installation after setting configurations.

14. A computer readable memory medium according to claim 11, wherein the printer driver database unit is configured to construct the printer driver database by obtaining printer drivers from each printer driver provider of the at least one printer, and the printer driver database unit is provided in a server machine or in the terminal, and is configured to update the printer driver database by obtaining the latest version of the printer driver from the printer driver provider of the at least one printer by accessing the Internet via the server machine or the terminal.

15. A computer readable memory medium according to claim 11, wherein the printer driver database unit is configured to construct the printer driver database by obtaining printer drivers from each printer driver provider of the at least one printer, and the printer driver database unit is provided in the at least one printer, and is adapted to update the printer driver database by obtaining the latest version of the printer driver from the printer driver provider of the at least one printer by accessing the Internet via the at least one printer, the server machine or the terminal.

16. A computer readable memory medium according to claim 11, wherein the printer driver database unit is configured to construct the printer driver database by obtaining printer drivers from each printer driver provider of the at least one printer, and to generate the database information after construction of the printer driver database.

17. A computer readable memory medium according to claim 11, wherein the printer driver database unit is configured to construct the printer driver database by obtaining printer drivers from each printer driver provider of the at least one printer, and to delete an older version printer driver and to update the database information.

* * * * *